United States Patent
Smee et al.

(10) Patent No.: US 7,035,316 B2
(45) Date of Patent: Apr. 25, 2006

(54) METHOD AND APPARATUS FOR ADAPTIVE LINEAR EQUALIZATION FOR WALSH COVERED MODULATION

(75) Inventors: John E. Smee, San Diego, CA (US); Ahmad Jalali, San Diego, CA (US); Fuyun Ling, San Diego, CA (US); Mark Wallace, Bedford, MA (US)

(73) Assignee: Qualcomm Incorporated, San Diego, CA (US)

( * ) Notice: Subject to any disclaimer, the term of this patent is extended or adjusted under 35 U.S.C. 154(b) by 463 days.

(21) Appl. No.: 10/315,707

(22) Filed: Dec. 9, 2002

(65) Prior Publication Data

US 2003/0123525 A1 Jul. 3, 2003

Related U.S. Application Data

(63) Continuation of application No. 09/636,008, filed on Aug. 10, 2000, now Pat. No. 6,522,683.

(51) Int. Cl.
*H04B 1/69* (2006.01)
*H03K 5/159* (2006.01)

(52) U.S. Cl. .................... 375/147; 375/149; 375/232
(58) Field of Classification Search ............... 375/144, 375/148, 130, 146, 147, 149, 229, 230, 232, 375/231, 350, 316, 285, 346; 370/335, 342, 370/441
See application file for complete search history.

(56) References Cited

U.S. PATENT DOCUMENTS

| | | | | |
|---|---|---|---|---|
| 5,103,459 A | * | 4/1992 | Gilhousen et al. | 370/206 |
| 5,353,300 A | * | 10/1994 | Lee et al. | 370/342 |
| 5,692,006 A | * | 11/1997 | Ross | 375/147 |
| 6,175,588 B1 | * | 1/2001 | Visotsky et al. | 375/148 |
| 6,522,683 B1 | * | 2/2003 | Smee et al. | 375/144 |

OTHER PUBLICATIONS

Jaeyoung Kwak et al. "Blind Adaptive Space–Time Receiving and Transmitting Diversities for Multiuser DS–CDMA Systems," IEEE Military Communications Conference, Oct. 31, 1999, Nov. 3, 1999, pp. 924–928.*

Teng Joon Lim et al. "Convergence Analysis of Chip–and Fractionally Spaced LMS Adaptive Multiuser CDMA Detectors," IEEE Transactions On Signal Processing, vol. 48, No. 8, Aug. 2000, pp. 2219–2228.*

Leon Berner et al. "Parallel Digital Architectures for High–Speed Adaptive DSSS Receivers," Asilomar Conference On Signals, Systems and Computers, Oct. 29, 2000, Nov. 3, 2000, vol. 2.*

* cited by examiner

*Primary Examiner*—Tesfaldet Bocure
(74) *Attorney, Agent, or Firm*—Philip Wadsworth; Sandra L. Godsey; S. Hossain Beladi

(57) ABSTRACT

A receive filter receives signals from a communication channel. The received signals correspond to original Walsh covered chip sequences transmitted by a transmit filter through the communication channel to the receive filter. The received signals are processed by an equalizer to generate a soft estimate of chip sequences corresponding to the original Walsh covered chip sequences. An N chip Walsh decover is then utilized to generate a soft estimate of code symbols corresponding to the soft estimate of the chip sequences. A number of symbol slicers are then used in parallel to produce a hard estimate of the code symbols corresponding to the soft estimate of code symbols generated by the N chip Walsh decover. Thereafter an N chip Walsh cover is used as part of a scheme to generate a hard estimate of chip sequences corresponding to the hard estimate of the code symbols generated by the symbol slicers. The hard estimate of the chip sequences generated with the aid of the N chip Walsh cover, and the soft estimate of the chip sequences generated by the equalizer, are used to generate a tracking mode error signal to adapt the response of the equalizer to the received signals.

14 Claims, 4 Drawing Sheets

METHOD AND APPARATUS FOR ADAPTIVE LINEAR EQUALIZATION FOR WALSH COVERED MODULATION

CROSS REFERENCE

This application is a continuation application of U.S. patent application Ser. No. 09/636,008, filed Aug. 10, 2000 entitled "Method and Apparatus for Adaptive Linear Equalization for Walsh Covered Modulation," now U.S. Pat. No. 6,522,683, issued on Feb. 18, 2003 to Smee et al.

BACKGROUND OF THE INVENTION

1. Field of the Invention

The present invention generally relates to an equalization technique in communication systems and more particularly to adaptive equalization in wireless data communication systems.

2. Description of Related Art

In relatively noise-free data communication systems, when data is transmitted over a communication channel by means of a linear modulation scheme, for example by using Quadrature Phase Shift Keying ("QPSK"), the number of detectable levels that the channel can support is essentially limited by Inter Symbol Interference ("ISI"). ISI arises because of the "spreading" of a transmitted symbol pulse due to the dispersive nature of the channel, which results in an overlap of adjacent symbol pulses. Stated differently, ISI occurs when a portion of a signal representative of one bit of information interferes with a different portion of the signal representative of a different bit of information.

The adverse effects of ISI are more pronounced where the signal-to-noise ratio is high and the channel is relatively noise-free. In such channels, which are typically present in data (as opposed to voice) communications, the presence of ISI greatly degrades performance of the communications system.

A common cause of ISI is the "multipath" phenomenon. Simply stated, multipath refers to interference caused by the reception of the same signal over multiple paths. Depending on the speed of a mobile wireless unit (also called the "subscriber unit"), condition of the surrounding environment such as existence of buildings or mountains, and the transmission bandwidth, the transmitted symbol pulses may arrive at the receiver at different times. As such, components of neighboring symbol pulses may interfere constructively or destructively.

However, even in the absence of "multipath," some ISI may still be generated due to the imperfections in the transmit and receive filters employed in the communications system. For example, frequency dependent attenuations in the physical devices comprising the transmit and receive filters can be a source of ISI.

It is generally known that equalization can be used to minimize the effects of ISI. Equalization involves altering a signal so that it may be more easily recognized at the receiver. A signal may be altered at the transmitter so that the influence of the channel on the signal will yield a signal capable of being properly recognized at the receiver. However, transmitter-based equalization is difficult since the transmitter must have a priori knowledge of the characteristics of the channel and any changes that may occur to the characteristics of the channel over time.

Equalization may also be performed at the receiver. Receiver-based equalization can use properties of the received signal to adjust equalization parameters. In wireless communications, since the mobile channel is random and time varying, equalizers must track the time varying characteristics of the mobile channel, and are thus called adaptive equalizers. Adaptive equalization attempts to apply a correct amount of equalization to the channel. In adaptive equalization, the equalizer coefficients are initially, or periodically, adjusted to "adapt" to the varying channel conditions. The general operating modes of an adaptive equalizer are the training and tracking modes. In the training mode, a known pilot symbol sequence is sent by the transmitter so that the receiver's adaptive equalizer may average its coefficients to proper initial values. The training sequence, i.e. the pilot symbol sequence, is typically a fixed, prescribed bit pattern.

Immediately following the training sequence, the modulated and spread message data are sent, and the adaptive equalizer at the receiver uses a prescribed algorithm, such as "least mean square" (LMS) or "recursive least squares" (RLS), to estimate the adaptive equalizer coefficients in order to compensate for the ISI caused by the transmit filter, the communication channel, and the receive filter.

Each data frame sent from the transmitter contains an initial pilot sequence, as well as a subsequent user message data sequence. As an example, the initial pilot sequence may take up approximately 5% of the entire data frame. However, the characteristics of the transmit filter, the communication channel, and the receive filter may change during each data frame, and also from frame to frame. Thus, the initial pilot sequence in each frame of data is used for achieving an initial setting of the equalizer coefficients. Moreover, after the initial setting of the equalizer coefficients, during each frame when user message data are received, the equalizer coefficients are adapted by utilizing a prescribed algorithm.

The initial pilot (or training) sequence in each frame is designed to permit the adaptive equalizer at the receiver to acquire the proper coefficients so that when the training sequence is finished, the filter coefficients are near optimal values for reception of user message data during the remainder of the frame. As user message data are received, the adaptive algorithm of the equalizer tracks the changing characteristics of the transmit filter, the communication channel, and the receive filter. As a consequence, the adaptive equalizer is continually changing its filter characteristics over time.

A common type of adaptive equalizer is a linear adaptive equalizer. There are two general types of linear adaptive equalizers, the "transversal" type and the "lattice" type. FIG. 1 illustrates a transversal linear adaptive equalizer 100. The transversal linear adaptive equalizer 100 in FIG. 1 is a type of finite-duration impulse response filter ("FIR") which is well known in the art. Referring to FIG. 1, an output of receive FIR filter 102 provides input to equalizer 100 which is marked as x(n) in FIG. 1. The output of receive FIR filter 102 is coupled to unit delay element $z^{-1}$ 106 and also to multiplier 104 which has a tap weight $w_0(n)$. The output of unit delay element $z^{-1}$ 106 is marked as x(n−1) and is coupled to unit delay element $z^{-1}$ 112 and to multiplier 108 which has a tap weight $w_1(n)$. The output of unit delay element $z^{-1}$ 112 is marked as x(n−2) and is coupled to a subsequent unit delay element not shown in FIG. 1 and to multiplier 114 which has a tap weight $w_2(n)$. Unit delay element $z^{-1}$ 122 and multiplier 118 having a tap weight of $w_{m-2}(n)$ receive their respective inputs, marked as x(n−m+2), from a previous unit delay element not shown in FIG. 1. The output of unit delay element $z^{-1}$ 122 is marked as x(n−m+1) and is coupled to multiplier 124 which has a tap weight $w_{m-1}(n)$.

Respective outputs of multipliers 104, 108, 114, 118, and 124 are added by adders 110, 116, 120, and 126 to result in a final output â(n) of equalizer 100. Equalizer output â(n) is fed to slicer 128 which results in a slicer output ã(n). Equalizer 100 output â(n) is subtracted from slicer 128 output ã(n) by adder 130. The result of the subtraction operation is e(n) which is the output of adder 130.

By way of overview, during operation of equalizer 100 an adaptive algorithm is utilized to adapt the equalizer coefficients which are represented by tap weights $w_0(n)$, $w_1(n)$ to $w_{m-1}(n)$ in FIG. 1. The equalizer coefficients are adjusted either on a sample by sample basis (i.e. whenever n is incremented by 1) or on a block by block basis (i.e. whenever a specified number of samples have been clocked into the equalizer). The adaptive algorithm used to adapt tap weights $w_0(n)$, $w_1(n)$ to $w_{m-1}(n)$ is controlled by the error signal e(n). During the tracking mode of the adaptive equalizer operation, the error signal e(n) is obtained by comparing the output â(n) of equalizer 100 with the output ã(n) of slicer 128.

Slicer 128 is an example of a "decision making device" which applies a thresholding operation in order to arrive at a "hard estimate" of the original data transmitted from the transmitter. This hard estimate which is the desired output of equalizer 100 is compared against the actual output â(n) of equalizer 100. The actual output â(n) of equalizer 100 is also referred to as a "soft estimate" of the original data transmitted from the transmitter. Subtraction of the actual output â(n) from the desired output ã(n) results in the error signal e(n). It is noted that during the training mode of the adaptive equalizer operation, the slicer operation is not required; the desired output ã(n) is known to the receiver and can be fed directly to adder 130 in order to arrive at error signal e(n).

The error signal e(n) is used in an adaptive algorithm to iteratively adjust the equalizer tap weights to arrive at their optimum values. An example of an adaptive algorithm is the "least mean square" (LMS) algorithm which is used to adjust the tap weights to their optimum values using the following iterative operation:

$$w_k(n+1) = w_k(n) + \Delta x_k(n) e^*(n) \quad \text{equation (1)}$$

where $x_k(n) = x(n-k)$, k being an integer between 0 and m−1; where
where $e(n) = \tilde{a}(n) - \hat{a}(n)$; and $$\hat{a}(n) = \sum_{k=0}^{m-1} w_k^*(n) x_k(n)$$

and where $\Delta$ is a constant.

Thus, each present tap weight $w_0(n)$, $w_1(n)$ to $w_{m-1}(n)$ is adjusted to a corresponding new tap weight $w_0(n+1)$, $w_1(n+1)$ to $w_{n-1}(n+1)$ by adding the respective present tap weight to the product of the constant $\Delta$, the corresponding input value $x_0(n)$, $x_1(n)$ to $x_{m-1}(n)$, and the present value of error signal e(n). The constant $\Delta$ is determined so as to control the variation between tap weights on successive iterations. The iterative process in equation (1) is repeated rapidly in a programming loop while adaptive equalizer 100 attempts to converge and minimize the error signal e(n). Upon reaching convergence, the adaptive algorithm freezes the tap weights until the error signal e(n) exceeds an acceptable level or until a new training sequence is sent from the transmitter.

However, the linear adaptive equalization scheme explained above in relation to FIG. 1 cannot be simply applied to a receiver system where "Walsh covering" has been used at the transmitter. By way of background, according to current standards in spread spectrum communication systems, such as those used in CDMA ("Code Division Multiple Access"), all subscriber units operating within a cell share a single "outer" PN ("Pseudorandom Noise") code. In a given spread spectrum communication system using Walsh functions (also called Walsh code sequences), a pre-defined Walsh function matrix having N rows of N chips each is established in advance to define the different Walsh functions to be used to distinguish subscriber signals in the same cell. A Walsh function matrix having N rows, with each row having N chips, is also referred to as a Walsh function matrix of order N. An example of a Walsh function matrix where N is equal to 4, i.e. a Walsh function matrix of order 4, is shown below:

$$\begin{bmatrix} 1 & 1 & 1 & 1 \\ 1 & 0 & 1 & 0 \\ 1 & 1 & 0 & 0 \\ 1 & 0 & 0 & 1 \end{bmatrix}$$

In the above example, there are 4 Walsh functions, each function having 4 chips. Each Walsh function is one row in the above Walsh function matrix. For example, the third row of the Walsh function matrix is the Walsh function having the sequence 1, 1, 0, 0. It is seen that each Walsh function, i.e. each row in the above matrix, has zero correlation with any other row in the matrix. Stated differently, exactly half of the chips in every Walsh function differ from those in every other Walsh function in the matrix.

In practice, Walsh functions of length 16, 64, or 128 (i.e. Walsh functions having respectively 16, 64, or 128 chips in each Walsh code sequence) are used. As an example, when a Walsh function of length 64 is used, orthogonality of 64 subscribers within a given cell is achieved.

Although the use of Walsh modulation in wireless communications is desirable, its use renders known adaptive equalization techniques inapplicable. The reason is that Walsh functions transform each data symbol (also called "code symbol" in the present application) to a sequence of chips which, after typically being processed by a chip level summer and being spread by a PN code, are transmitted across a communication channel to a receiver. Thus, what is ultimately received at the receive FIR, such as receive FIR 102 in FIG. 1, is a sequence of chips as opposed to code symbols. As such, the known adaptive equalization schemes, such as that discussed in relation with FIG. 1, cannot be directly applied since, for example, the error signal e(n), must be determined by a method which takes into account the transformation of symbols into chips at the transmitter. Accordingly, there is need in the art for an adaptive equalizer which can be used when code symbols to be transmitted undergo "Walsh covering" and a sequence of "Walsh covered" chips, as opposed to the original code symbols, are transmitted.

SUMMARY OF THE INVENTION

The present invention is directed to a method and apparatus for adaptive linear equalization for Walsh covered modulation. The invention's adaptive equalization scheme can advantageously be used when code symbols to be transmitted undergo Walsh covering and a sequence of Walsh covered chips, as opposed to the original code symbols, is transmitted.

In one aspect of the invention a receive filter receives signals from a communication channel. The received signals correspond to original Walsh covered chip sequences transmitted by a transmit filter through the communication channel to the receive filter. The received signals are processed by an equalizer to generate a soft estimate of chip sequences corresponding to the original Walsh covered chip sequences. An N chip Walsh decover is then utilized to generate a soft estimate of code symbols corresponding to the soft estimate of the chip sequences. A number of symbol slicers are then used in parallel to produce a hard estimate of the code symbols corresponding to the soft estimate of code symbols generated by the N chip Walsh decover.

Thereafter an N chip Walsh cover is used as part of a scheme to generate a hard estimate of chip sequences corresponding to the hard estimate of the code symbols generated by the symbol slicers. The hard estimate of the chip sequences generated with the aid of the N chip Walsh, cover, and the soft estimate of the chip sequences generated by the equalizer, are used to generate a tracking mode error signal to adapt the response of the equalizer to the received signals.

DETAILED DESCRIPTION OF THE PREFERRED EMBODIMENTS

The presently disclosed embodiments are directed to a method and apparatus for adaptive linear equalization for Walsh covered modulation. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
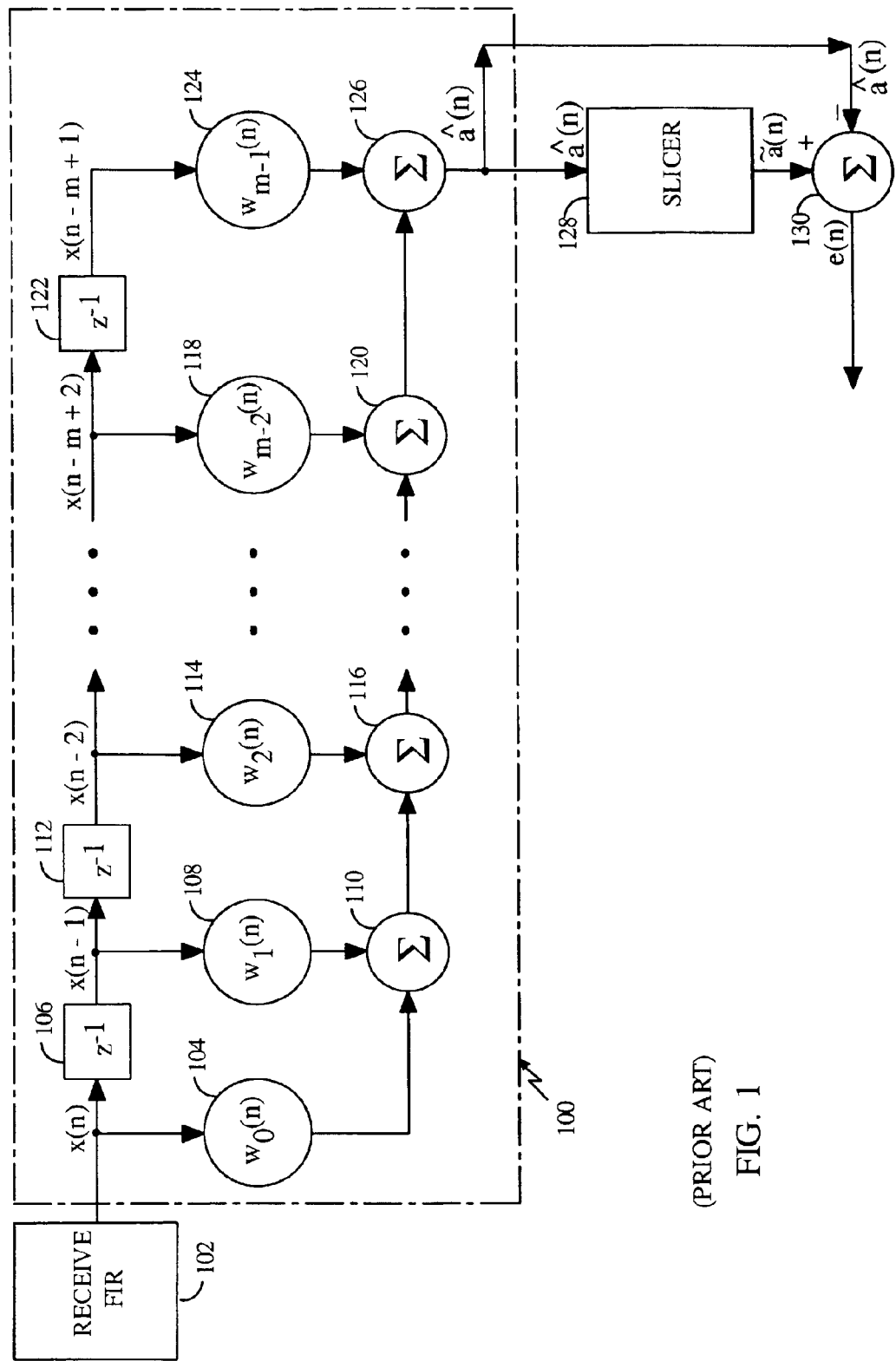
FIG. 1 illustrates an example of a known linear adaptive equalizer.
Figure 2:
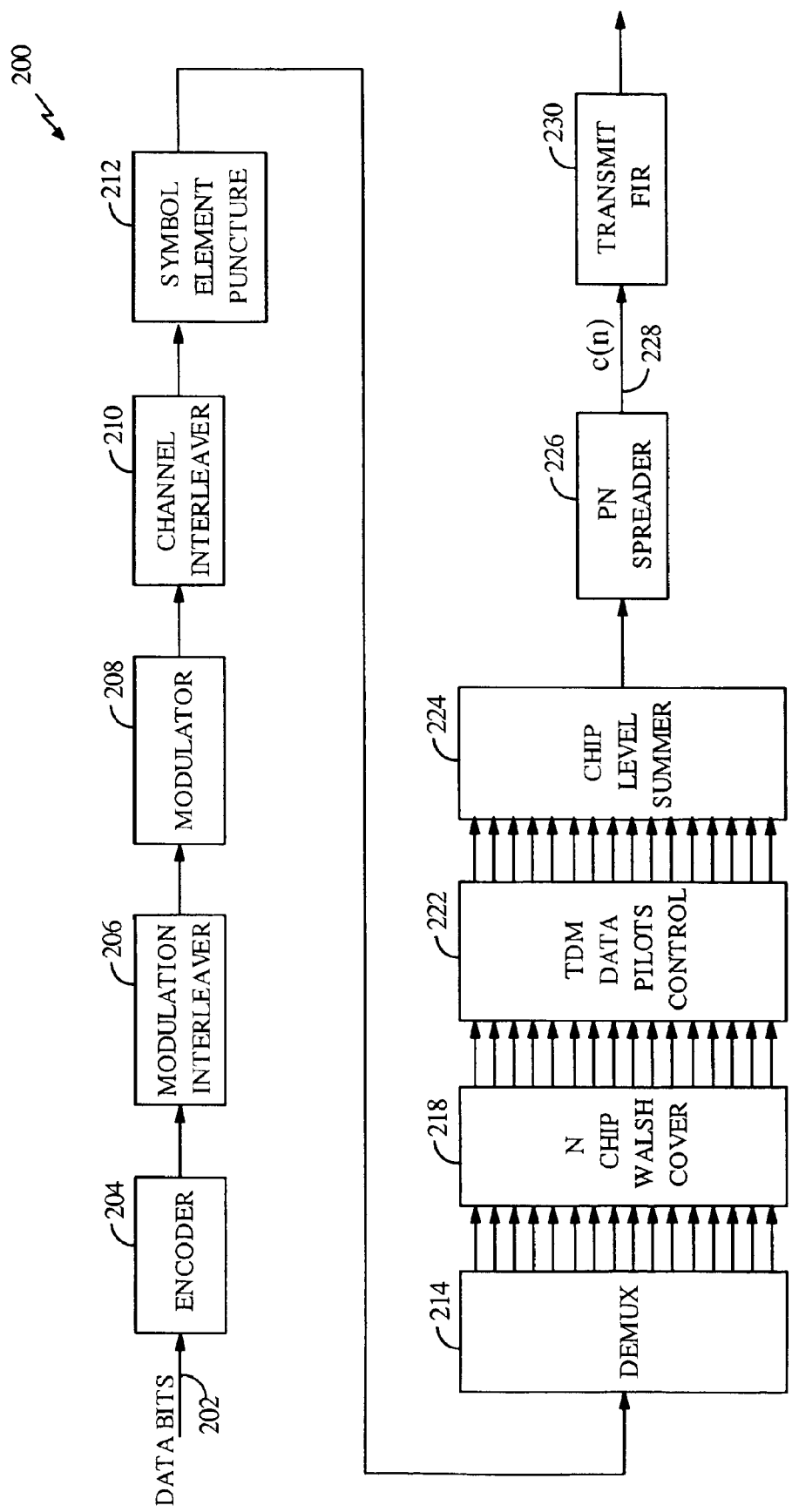
FIG. 2 illustrates, in block diagram form, an example of generation of Walsh covered chip sequences corresponding to input message data bits.

FIG. 2 illustrates an example of how a spread spectrum chip sequence c(n) 228 is generated from input data bits 202. Input data bits 202 are also referred to as "message data bits" or the "original message" in the present application. The exemplary system 200 shown in FIG. 2 constitutes part of a transmitter which may generally reside in a base station, gateway, satellite repeater, or a subscriber unit, depending on whether the transmission is taking place in a forward link or a reverse link. In the example shown in FIG. 2, input data bits 202 contain the information or message of interest to be transmitted across a communication channel to a receiver (the communication channel is not shown in any of the Figures).

Message data bits 202 are first inputted to an encoder 204. Encoder 204 can be an FEC ("Forward Error Correction") encoder utilized to introduce redundancy in the message data bits 202 using convolutional coding techniques known in the art. The redundancy introduced by encoder 204 enables the receiver to correct some detection errors without the need to increase transmission power. Output of encoder 204 is generally referred to as "code symbols." Generally, a single message data bit inputted to encoder 204 corresponds to several code symbols outputted from encoder 204.

In an alternative approach, encoder 204 performs a "source encoding" function prior to the redundancy encoding discussed above. Source encoding involves performing data compression for efficient representation of input data bits 202 prior to introducing redundancy and the generation of code symbols.

Modulation interleaver 206 receives code symbols from encoder 204 and "interleaves" the code symbols prior to processing by modulator 208. Interleaving is utilized in a transmission system, such as system 200 in FIG. 2, in order to cause potential noise bursts or "deep fades" to appear random (i.e. independent) rather than correlated at the receiver. Interleaving is also utilized to ensure that, in the presence of noise bursts or deep fades, important bits in a block of source data are not corrupted at the same time. Since error control codes are generally designed to protect against channel errors that may occur randomly, by scrambling the time order or source data bits, interleavers ensure that error control coding remains effective in detection and cancellation of errors. In the exemplary system 200 in FIG. 2, interleaver 206 may be a block interleaver or a convolutional interleaver, which are both known in the art.

The interleaved code symbols are passed on to modulator 208. In wireless digital communications, a number of different, but related, modulation schemes can be used in modulator 208. For example, Binary Phase Shift Keying (BPSK), Differential Phase Shift Keying (DPSK), Quadrature Phase Shift Keying (QPSK) (including OQPSK and π/4QPSK), and Quadrature Amplitude Modulation (QAM), are digital modulation techniques which can be utilized in modulator 208 to modulate the code symbols generated by modulation interleaver 206. However, modulator 208 is not limited to any specific type of modulator and can be any of the many digital modulators used in wireless communications.

As shown in FIG. 2, modulator 208 passes the modulated signals to channel interleaver 210. An essential feature of a transmission channel is that a transmitted signal is corrupted by a variety of possible mechanisms, such as noise bursts generated by electronic devices. In fact, during modulation by modulator 208, some noise bursts may be introduced by the modulator itself. In order to make noise bursts appear random, channel interleaver 210 is utilized. Channel interleaver 210 modifies the time order of the signals to be transmitted across the channel. Channel interleaver 210 may be a block interleaver or a convolutional interleaver.

In the exemplary system 200, the channel interleaved symbols from interleaver 210 are passed on to symbol puncture element 212. Symbol puncturing is a process by which some of the message symbols are deleted and replaced by desired control symbols. Thus, puncturing is generally used to insert control information, such as power control information, in the source data for proper handling of the communications between the transmitter and the receiver. Although symbol puncturing has a potential for introducing errors in the message or source data received at the receiver, recent techniques minimize or eliminate such errors. In the exemplary system 200, symbol puncture element 212 is used for inserting various control symbols, such as power control symbols and symbols providing reference for time, phase, and signal strength, into the message symbol stream. The control symbols punctured into the message symbols are time division multiplexed into the message symbols.

As shown in FIG. 2, the symbol stream outputted by symbol puncture element 212 is inputted to DEMUX 214. DEMUX 214 is used for demultiplexing the input symbol stream into a number of parallel output symbol streams. In the exemplary system 200 in FIG. 2, DEMUX 214 is a one-to-16 demultiplexer. In other words, 16 parallel symbol streams are outputted at the same time. The reason for needing 16 parallel outputs is that a Walsh function matrix of order 16 is used in N chip Walsh cover 218 in the exemplary system 200. In other embodiments, a Walsh function matrix of order 64 or 128 may be used in which case DEMUX 214 would be a one-to-64 or one-to-128 demultiplexer, respectively. It is noted that, in the exemplary system 200, the 16 parallel outputs of DEMUX 214 can correspond to a single user, or up to 16 different users. When the data symbols inputted to DEMUX 214 correspond to a single user, the input data symbols are first buffered and then outputted in 16 parallel symbol streams to N chip Walsh cover 218.

N chip Walsh cover 218 performs Walsh covering (or Walsh modulation) on each of the parallel input symbols coming from DEMUX 214. As stated above, in the present example N=16, i.e. the Walsh function matrix is a matrix of order 16. However, the value of N is a design choice and N could be 64 or 128. As shown in FIG. 2, DEMUX 214 outputs 16 parallel symbol streams to N chip Walsh cover 218. As discussed earlier, Walsh functions are orthogonal functions which are used to transform each input symbol into a respective sequence of output chips where each sequence of output chips is orthogonal with every other sequence of output chips. Typically, the transformation is performed by multiplying each inputted symbol by a sequence of chips in a particular Walsh function. For each symbol, therefore, a sequence of chips is outputted by N chip Walsh cover 218. The sequence of chips is of length N, which in the present example is 16. Thus, in the exemplary system 200, for each inputted symbol, 16 chips are outputted by N chip Walsh cover 218. In the present application, "original Walsh covered chip sequences" refers to chip sequences outputted by N chip Walsh cover 218 in exemplary system 200.

In CDMA communications, Walsh functions are used in the forward link to separate users (i.e. the subscriber units). As an example, for a given sector (in CDMA, each sector is a subset of a cell), each forward channel is assigned a distinct Walsh function. In other words, communications between a base station and each subscriber unit are coded by a distinct Walsh code sequence. Referring to FIG. 2, each symbol inputted to N chip Walsh cover 218 is multiplied with all the chips in the Walsh code sequence assigned to a particular subscriber unit (e.g., a particular cell phone user). The operation of a Walsh function to convert each symbol into a sequence of chips is also referred to as Walsh "covering."

The N chip Walsh covered chips, i.e. the sequences of outputted N chips corresponding to respective symbols, are passed in parallel to "TDM data pilots control" 222. In the exemplary system 200, "TDM data pilots control" 222 is used for inserting pilot chips for "training" the coefficients of an adaptive linear equalizer which will be discussed in relation to FIG. 3 below. The pilot chips are time division multiplexed into the chip sequences being outputted by N chip Walsh cover 218. As discussed below, these pilot chips are known to the receiver and as such can be used by the receiver to train the coefficients of the receiver's adaptive linear equalizer. Typically, pilot chips are inserted in each data frame and comprise approximately 5% of each frame that is transmitted to the receiver.

Each of the 16 parallel chip sequences processed by "TDM data pilots control" 222 is outputted to chip level summer 224. Chip level summer 224 is utilized to provide a "vertical sum" of each of the chip sequences outputted by "TDM data pilots control" 222. To explain the "vertical sum" operation of chip level summer 224, a simple example is used where N in the N chip Walsh cover is equal to four (instead of N being equal to 16, which is the case in the exemplary system 200). In this simple example, suppose that the four (generally complex) symbols [a,b,c,d] are the four code symbols which are to be "covered" by the Walsh function matrix of order 4. The Walsh function matrix of order 4 is:

$$\begin{bmatrix} 1 & 1 & 1 & 1 \\ 1 & 0 & 1 & 0 \\ 1 & 1 & 0 & 0 \\ 1 & 0 & 0 & 1 \end{bmatrix}$$

The resulting four output chip sequences, which are obtained by multiplying each Walsh function (i.e. each row in the Walsh function matrix) by each of the input code symbols, are:

Chip sequence (1)=[a, a, a, a]

Chip sequence (2)=[b, −b, b, −b]

Chip sequence (3)=[c, c, −c, −c]

Chip sequence (4)=[d, −d, −d, d]

The "vertical sum" of these four chip sequences is obtained by adding the chips in corresponding columns. Thus, the resulting vertical sum is:

[a+b+c+d, a−b+c−d, a+b−c−d, a−b−c+d].

As shown in FIG. 2, the output of chip level summer 224 is provided to PN ("Pseudorandom Noise") spreader 226. By way of background, a PN sequence is a binary sequence that is deterministic but resembles a random binary sequence. As such, a PN sequence has nearly an equal number of 0s and 1s, a very low correlation between shifted versions of the sequence, and a very low cross-correlation between any two sequences. These properties make PN sequences very desirable in wireless digital communications. The output chip sequence of a PN spreader is also referred to as a spread spectrum signal since it has a bandwidth several orders of magnitude greater than the minimum required signal bandwidth. Spread spectrum signals are demodulated at the receiver through cross-correlation with a locally generated version of the PN sequence. Cross-correlation with the correct PN sequence "despreads" the spread spectrum signal and restores the modulated message, whereas cross-correlating a signal by an unintended user results in a very small amount of wideband noise at the receiver output.

An important reason for using a PN spreading technique is its inherent interference rejection capability. Since each user is assigned a unique PN code which is approximately orthogonal to the codes of other users, the receiver can separate each user based on their respective codes, even though the users occupy the same frequency spectrum at all times. Since all users are able to share the same spectrum, spread spectrum can eliminate frequency planning, since all cells can use the same frequency channels.

The PN sequence is usually generated using sequential logic. Feedback shift registers consisting of consecutive stages of state memory elements are typically utilized. Binary sequences are shifted through the shift registers in response to clock pulses, and the outputs of the various stages are logically combined and fed back as the input to the first stage. The output of the last stage is the desired PN sequence.

PN spreader 226 impresses a PN sequence on the chips outputted by chip level summer 224 in a manner known in the art. As an example, the modulation by PN spreader 226 can be performed by a modulo-2 addition (i.e. XORing) of each chip outputted by chip level summer 224 with a respective chip in a PN sequence generated by PN spreader 226. Thereafter, the result of the modulo-2 addition is, for example, mapped into a binary PSK signal. The result of the PN spreading performed on the output of chip level summer 224 is output chip sequence c(n) 228. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, disclosed in U.S. patent application entitled "Method and Apparatus for High Rate Packet Data Transmission" Ser. No. 08/963,386 filed on Nov. 3, 1997, now U.S. Pat. No. 6,574,211, issued on Jun. 3, 2003 to Padovani et al., and assigned to the assignee of the present invention. The disclosure in that patent application is also hereby fully incorporated by reference into the present application.

Figure 3:
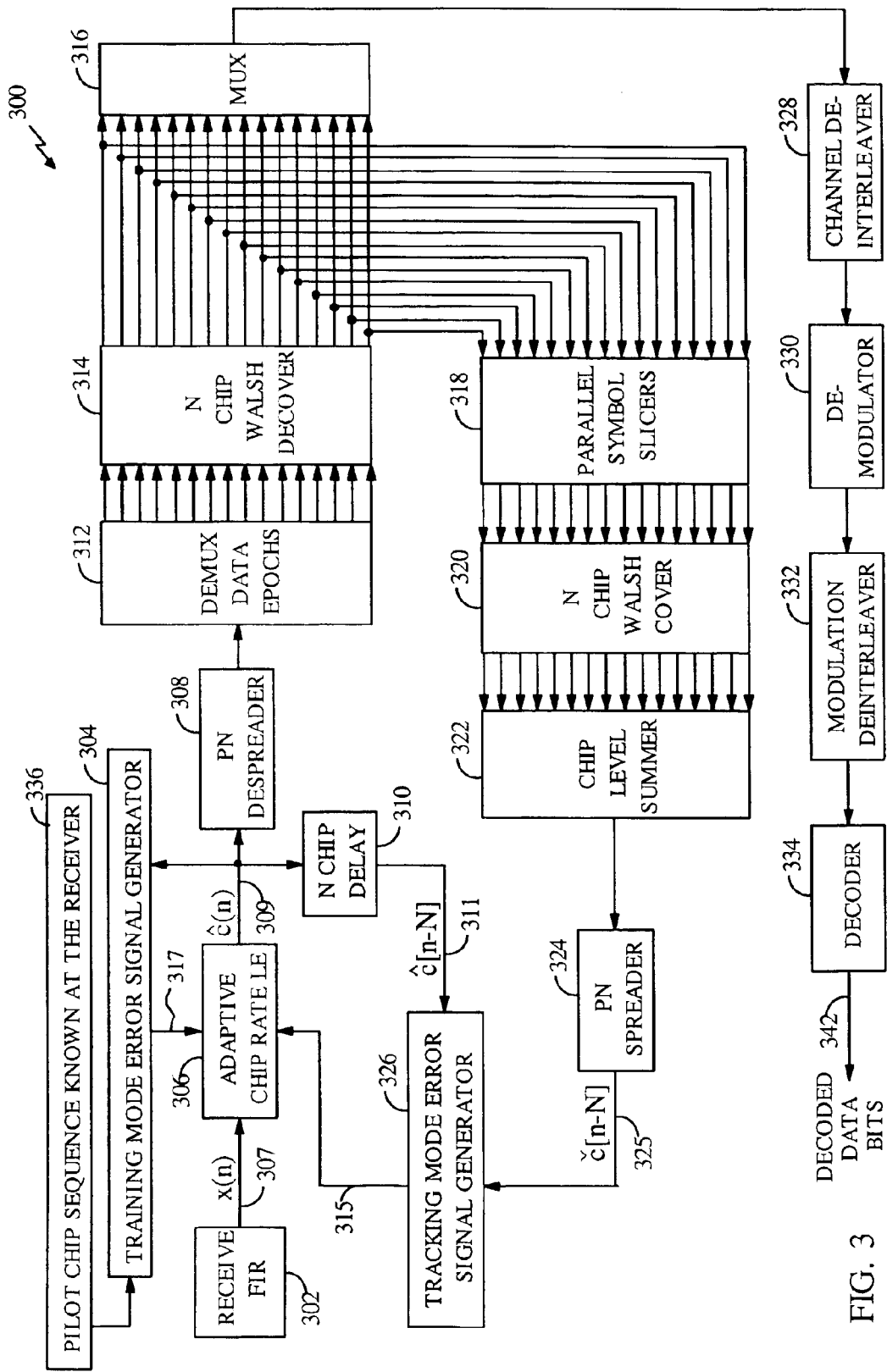
FIG. 3 illustrates an exemplary system 300 which is used to implement an adaptive equalization scheme when received signals correspond to Walsh covered chip sequences sent by a transmitter.

Output chip sequence c(n) 228 is passed on to "transmit FIR" 230. Transmit FIR 230 is typically an FIR filter used for pulse shaping signals prior to their transmission over a communication channel. Transmit FIR 230 is also referred to as a "transmit filter" in the present application. As stated above, the transmit filter itself typically introduces a certain amount of ISI in the transmitted signal. Pulse shaping is a technique known in the art which can be used to reduce ISI in the transmitted signal. The output of transmit FIR 230 is sent across the communication channel to the receiver which is shown in FIG. 3. The communication channel usually refers to the physical medium which is used to send the signals from the transmitter to the receiver. The communication channel in the present application may comprise free space, wire lines, optical fiber cables, or a microwave radio channel. In wireless communications, due to factors such as multipath, the channel itself introduces a certain amount of ISI in the transmitted signal.

FIG. 3 shows an exemplary system 300, in accordance with one embodiment, which resides in a receiver unit. Receive FIR 302 receives output chip sequence c(n) 228 transmitted by transmit FIR 230 through the communication channel (the communication channel is not depicted in any of the Figures). Receive FIR 302 is utilized to perform pulse shaping on signals received from the communication channel. Receive FIR 302 is also referred to as the "receive filter" in the present application. As stated above, the communication channel and receive filter themselves typically introduce a certain amount of ISI in the received signal. Pulse shaping is a technique known in the art which can be used to reduce ISI in the received signal. Various pulse shaping techniques known in the art may be used in receive FIR 302 in the exemplary system 300. For example, a filter based on the Nyquist criterion for ISI cancellation can be used or, alternatively, a "raised cosine roll off filter" or a "Gaussian pulse-shaping filter" may be used.

Pulse shaped signals corresponding to output chip sequence c(n) 228 received through the communication channel are passed from receive FIR 302 to "adaptive chip rate linear equalizer" 306 (or "adaptive chip rate LE" 306) in accordance with one embodiment. The chip sequences received at adaptive chip rate LE 306 have usually been affected by ISI through the influence of various factors such as transmit FIR 230, the communication channel, and receive FIR 302. The input signal to adaptive chip rate LE 306 is marked as x(n) and is referred to generally by numeral 307. In the present application, input x(n) 307 is also referred to as "received Walsh covered chip sequences" or simply as "signals" supplied to an equalizer.

Figure 4:
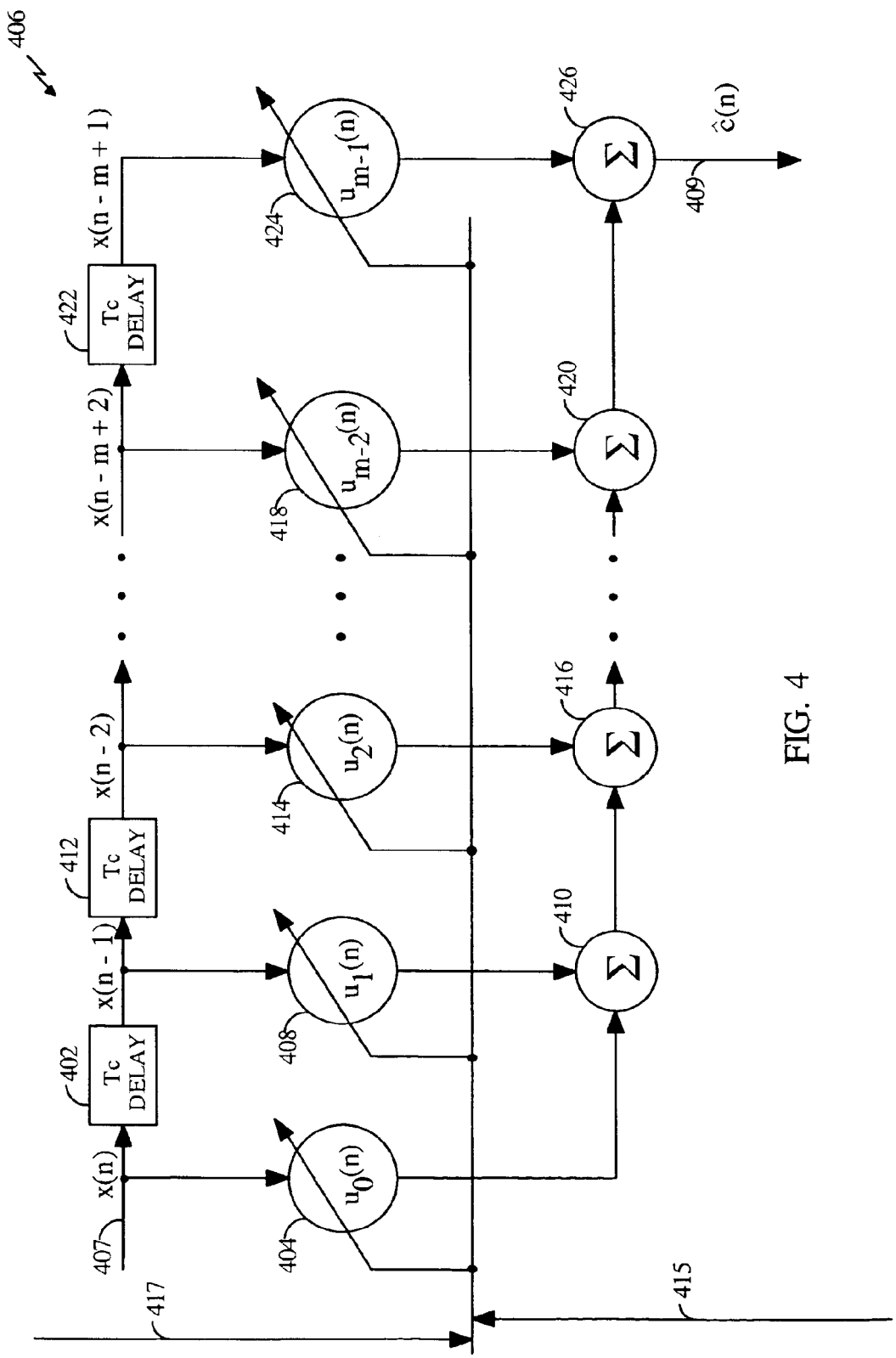
FIG. 4 is a detailed illustration of an adaptive chip rate linear equalizer used in system 300 of FIG. 3.

An exemplary block diagram for implementation of adaptive chip rate LE 306 is shown in FIG. 4 as adaptive chip rate LE 406. As shown in FIG. 4, the input to adaptive chip rate LE 406 is x(n) 407 which corresponds to x(n) 307 in FIG. 3. The output of adaptive chip rate LE 406 is ĉ(n) 409 which corresponds to ĉ(n) 309 in FIG. 3. Other inputs to adaptive chip rate LE 406 are "tracking mode error signal" 415 and "training mode error signal" 417 which correspond, respectively, to "tracking mode error signal" 315 and "training mode error signal" 317 in FIG. 3. The exemplary adaptive chip rate LE 406 shown in FIG. 4 is a transversal filter which is a type of FIR filter. The input x(n) is coupled to a unit delay element marked as Tc delay 402 and also to multiplier 404 which has a tap weight $u_0(n)$. It is noted that in the exemplary embodiment of adaptive chip rate LE 406 in FIG. 4, "Tc" stands for one chip interval and each Tc unit delay element introduces a delay equal to one chip interval. However, it may be desirable to space adaptive chip rate LE 406 with delay elements each having a delay equal to a fraction of a chip interval. In that case, adaptive chip rate LE 406 would be a type of a "fractionally spaced" equalizer.

The output of unit delay element Tc delay 402 is marked as x(n−1) and is coupled to unit delay element Tc delay 412 and to multiplier 408 which has a tap weight $u_1(n)$. The output of unit delay element Tc delay 412 is marked as x(n−2) and is coupled to a subsequent unit delay element not shown in FIG. 4 and to multiplier 414 which has a tap weight $u_2(n)$. Unit delay element Tc delay 422 and multiplier 418 having a tap weight of $u_{m-2}(n)$ receive their respective inputs, marked as x(n−m+2), from a previous unit delay element not shown in FIG. 4. The output of unit delay element Tc delay 422 is marked as x(n−m+1) and is coupled to multiplier 424 which has a tap weight $u_{m-1}(n)$.

Respective outputs of multipliers 404, 408, 414, 418, and 424 are added by adders 410, 416, 420, and 426 to result in a final output ĉ(n) 409 of equalizer 406. The operation of adaptive linear equalizer 406 and the dynamic adjustment of tap weights $u_0(n)$, $u_1(n)$ to $u_{m-1}(n)$ during the training and tracking modes of the operation of the equalizer are discussed in a later section of this application.

Output ĉ(n) 409 of linear adaptive equalizer 406 in FIG. 4 corresponds to output ĉ(n) 309 of linear adaptive equalizer 306 in FIG. 3. As seen in FIG. 3, output ĉ(n) 309 is coupled to "PN despreader" 308, "training mode error signal generator" block 304, and "N chip delay" 310. PN despreader 308 is used to generate an identical pseudo-random pattern as that which was generated by PN spreader 226 in system 200 of the transmitter. When the PN sequences generated by PN spreader 226 and PN despreader 308 are properly synchronized, the effect of PN spreading impressed by system 200 at the transmitter is removed at system 300 in the receiver. Initially, prior to the transmission of the message signals, synchronization may be achieved by transmitting a fixed pseudo-random bit pattern which the receiver will recognize despite the presence of interference. After synchronization of PN spreader 226 and PN despreader 308 is achieved, the transmission of message signals can begin. By way of example, PN despreader 308 can be implemented utilizing a cross-correlator, a sampler, a chip-rate clock and a PN generator in a manner known in the art.

The chip sequences outputted by PN despreader 308 are inputted to "DEMUX data epochs" 312. In the exemplary system 300 in FIG. 3, DEMUX data epochs 312 is a one-to-16 demultiplexer which is utilized during the "decision directed" period of operation of system 300 in the receiver. The decision directed period is the period of time in which adaptive chip rate LE 306 is in a tracking mode of operation. In the exemplary system 300, the chip sequences outputted by PN despreader 308 are buffered in DEMUX 312 and then demultiplexed on 16 parallel lines to "N chip Walsh decover" 314. It is manifest that in other embodiments, a one-to-64 or a one-to-128 demultiplexer can be used without departing from the scope of the present invention.

The 16 parallel outputs of DEMUX data epochs 312 are provided to "N chip Walsh decover" 314. N chip Walsh decover 314 uses the same Walsh code sequence (i.e. the same Walsh function) which was used in N chip Walsh cover 218 of system 200 in the transmitter. N chip Walsh decover 314 in system 300 removes the effects of N chip Walsh cover 218 and chip level summer 224 from the received chip sequences such that the 16 parallel outputs of N chip Walsh decover 314 are in the form of code symbols.

However, the code symbols at the output of N chip Walsh decover 314 are merely "soft estimates" of the code symbols corresponding to the actual message signal transmitted by system 200. In other words, no decision has been made to quantize each of the 16 parallel code symbols at the output of N chip Walsh decover 314 to an element of symbol constellation. As discussed below, a decision in favor of a certain element of symbol constellation for each of the individual code symbols at the 16 parallel outputs of the N chip Walsh decover 314 can be made by a device such as "parallel symbol slicers" 318.

Parallel symbol slicers 318 are used to perform a quantization operation according to which a decision is made in favor of a certain element of symbol constellation. By way of background, in order to adapt the coefficients (i.e. the tap weights) of an adaptive linear equalizer, knowledge of the "desired" output of the equalizer is required. A comparison between the desired output and the actual output of the equalizer is used to form an error signal to adjust the tap weights of the equalizer. During the training mode of operation of the adaptive linear equalizer, a replica of a pilot chip sequence transmitted by system 200 is stored, can be generated, or is otherwise known at system 300 of the receiver. The replica of the pilot chips defines the desired output of adaptive chip rate LE 306. As such, during the training mode of operation of adaptive chip rate LE 306, the required error signal can be generated by a comparison of the replica of the pilot chip sequence (i.e. the known desired output) and the actual output of adaptive chip rate LE 306.

On the other hand, in the "decision directed mode" of operation of adaptive chip rate LE 306, a "hard estimate" of each of the code symbols at the 16 parallel outputs of N chip Walsh decover 314 must be made. If the average probability of a decision error is small (for example, less than 10%), the hard estimates made by parallel symbol slicers 318 are good enough to arrive at an estimated error signal which is accurate most of the time. In other words, the error signal generated based on the hard estimate of the desired output made by symbol slicers 318 is usually accurate enough to improve tap weights of adaptive chip rate LE 306. An improvement in the tap weights of equalizer 306 in turn results in a lower average probability of symbol errors and therefore results in more accurate estimates of the error signal for further adaptation of equalizer 306.

The hard estimates of the code symbols are passed, in groups of 16 parallel outputs, from parallel symbol slicers 318 to "N chip Walsh cover" 320. N chip Walsh cover 320 performs Walsh covering (or Walsh modulation) on each of the hard estimate parallel code symbols outputted by parallel symbol slicers 318. As stated above, in the present example N=16, i.e. the Walsh function matrix is a matrix of order 16. However, with the limitation that the Walsh function matrix used in N chip Walsh cover 320 in the receiver must be of the same order as the Walsh function matrix used in N chip Walsh cover 218 in the transmitter, the value of N is a design choice and N could be, for example, 64 or 128.

N chip Walsh cover 320 generates 16 parallel chip sequences at its output and provides them to "chip level summer" 322. As stated above, each chip sequence generated at each of the 16 parallel outputs of N chip Walsh cover 320 contains 16 chips which correspond to a single symbol code. The 16 parallel chip sequences (each sequence having 16 chips) outputted by N chip Walsh cover 320 are provided to "chip level summer" 322. Chip level summer 322 is utilized to provide vertical sums of the chip sequences outputted by N chip Walsh cover 320 in a manner which was described earlier in relation to chip level summer 224.

The output of chip level summer 322 is coupled to "PN spreader" 324. As explained above in relation to PN spreader 226, PN spreader 324 impresses a PN sequence on the chips outputted by chip level summer 322 in a manner known in the art. The result of the PN spreading performed on the output of chip level summer 322 is output chip sequence č[n−N] 325. As discussed in more detail below, a combined effect of N chip Walsh cover 320, chip level summer 322, and PN spreader 324 is to generate a sequence of chips corresponding to the hard estimates of code symbols outputted by parallel symbol slicers 318.

Output chip sequence č[n−N] 325 is provided to "tracking mode error signal generator" block 326. Another input to "tracking mode error signal generator" block 326 is ĉ[n−N] 311 which is the output of "N chip delay" 310. ĉ[n−N] 311 is obtained by delaying output chip sequence ĉ(n) 309 of adaptive chip rate LE 306 by N chips through N chip delay 310. As discussed in more detail in a later section of this application, a tracking mode error signal 315 is generated by comparing output ĉ[n−N] 311 of N chip delay 310 with output chip sequence č[n−N] 325 generated by PN spreader 324. Tracking mode error signal 315 is coupled to adaptive chip rate LE 306 for adjusting its tap weights during the tracking mode, i.e. the decision directed mode, of operation of adaptive chip rate LE 306. Tracking mode error signal 315 is shown as tracking mode error signal 415 in FIG. 4. As shown in FIG. 4, tracking mode error signal 415 is used to adjust the values of $u_0(n)$, $u_1(n)$ to $u_{m-1}(n)$ which are the coefficients (or tap weights) for multipliers 404, 408, to 424 in adaptive chip rate LE 406 (or adaptive chip rate LE 306).

As shown in FIG. 3, "training mode error signal generator" block 304 provides a training mode error signal 317 to adaptive chip rate LE 306. As discussed in more detail in a later section of this application, training mode error signal 317 is generated by comparing output chip sequence ĉ(n) 309 of adaptive chip rate LE 306 with the "pilot chip sequence known at the receiver" provided by conceptual block 336 in FIG. 3. Training mode error signal 317 is coupled to adaptive chip rate LE 306 for adjusting its tap weights during the training mode of operation of adaptive chip rate LE 306. Training mode error signal 317 is shown as training mode error signal 417 in FIG. 4. As shown in FIG. 4, training mode error signal 417 is used to adjust the values of $u_0(n)$, $u_1(n)$ to $u_{m-1}(n)$ which are the coefficients (or tap weights) for multipliers 404, 408 to 424 in adaptive chip rate LE 406 (or adaptive chip rate LE 306).

The operation of the exemplary system 300 begins with training the coefficients (i.e. the tap weights) of adaptive chip rate LE 306 at the beginning of each transmitted data frame. It is recalled that the coefficients of adaptive chip rate LE 306 must be adjusted to reduce or eliminate the ISI caused by transmit FIR 230, the communication channel, and receive FIR 302. An initial value of the coefficients of adaptive chip rate LE 306 is determined in the "training" period of the equalizer when an initial assessment of the amount of ISI introduced by transmit FIR 230, the communication channel, and receive FIR 302 is made.

The initial assessment of the amount of ISI caused by transmit FIR 230, the communication channel, and receive FIR 302 during the training period is made by the prior knowledge of system 300 of the desired output of adaptive chip rate LE 306. It is recalled that in the exemplary system 200, "TDM data pilots control" 222 was used for inserting pilot chips for "training" the coefficients of the "adaptive chip rate LE" 306. As stated above, typically pilot chips are inserted in each data frame and comprise approximately 5% of each frame that is transmitted to the receiver. These pilot chips are known to the exemplary system 300 in the receiver and are used to train the coefficients of the receiver's adaptive linear equalizer 306. The conceptual block 336 in FIG. 3, i.e. "pilot chip sequence known at the receiver" block 336, has stored therein, or generates, a replica of the pilot chips. During the training mode of operation, the actual output chip sequence ĉ(n) 309 of adaptive chip rate LE 306 is compared with the replica of the pilot chips known at the receiver. The replica of the pilot chips are the desired output of adaptive chip rate LE 306. As seen in FIG. 3, output chip sequence ĉ(n) 309 of adaptive chip rate LE 306 (i.e. the actual output) as well as the pilot chips from "pilot chip sequence known at the receiver" block 336 (i.e. the desired output) are both provided to "training mode error signal generator" block 304. "Training mode error signal generator" block 304 uses the two chip sequences (i.e. the actual output and the desired output) and applies an algorithm known in the art to generate training error signal 317 to adjust the tap weights of adaptive chip rate LE 306.

Training error signal 317 can be generated using various algorithms known in the art. For example, a "least mean square" ("LMS") algorithm could be used. One goal of the LMS algorithm is to minimize the "mean square error" (MSE) resulting from comparing the desired output with the actual output of adaptive chip rate LE 306. Upon a number of rapid iterations and adjustments to the tap weights of adaptive chip rate LE 306 based on the mean square error, the LMS algorithm "converges," i.e. the mean square error approaches a constant value and the actual average error approaches zero.

As discussed above, according to the LMS algorithm, the values of tap weights of adaptive chip rate LE 306, shown in detail as adaptive chip rate LE 406 in FIG. 4, are calculated as follows:

$$u_k(n+1) = u_k(n) + \Delta x_k(n) e^*(n) \quad \text{equation (2)}$$

where $x_k(n) = x(n-k)$, k being an integer between 0 and m−1;

where $e(n) = c(n) - \hat{c}(n)$; and $$\hat{c}(n) = \sum_{k=0}^{m-1} u_k^*(n) x_k(n)$$

and where Δ is a constant.
where $u_k(n)$ are tap weights in adaptive chip rate LE 406 in FIG. 4 at chip interval n, where c(n) is the same as c(n) 228 in FIG. 2 and ĉ(n) is the same as ĉ(n) 309 in FIG. 3 (or ĉ(n) 409 in FIG. 4). It is noted that during the training mode of operation, e(n) is the training mode error signal at chip interval n and that e(n) is the same as training mode error signal 317 in FIG. 3 (or training mode error signal 417 in FIG. 4).

Thus, each present tap weight $u_0(n)$, $u_1(n)$ to $u_{m-1}(n)$ is adjusted to a corresponding new tap weight $u_0(n+1)$, $u_1(n+1)$ to $u_{m-1}(n+1)$ by adding the respective present tap weight to the product of the constant Δ, the corresponding input value $x_0(n)$, $x_1(n)$ to $x_{m-1}(n)$, and the present value of error signal e(n). The constant Δ is determined so as to control the variation between tap weights on successive iterations. The iterative process in equation (2) is repeated once every chip interval Tc in a programming loop while adaptive equalizer 306 attempts to converge and minimize the mean square value of e(n). Upon reaching convergence, the adaptive algorithm freezes the tap weights until the error signal e(n) exceeds an acceptable level or until a new training pilot chip sequence is sent from the transmitter.

In the present embodiment, the error signal e(n) is utilized in a least mean square (LMS) algorithm to minimize the mean square error (MSE) in a manner known in the art. An estimate of the mean square error can be formed by the time average of the sum of squares of the values of e(n) at each chip interval. Once the mean square error has been minimized, the tap weights $u_0(n)$, $u_1(n)$ to $u_{m-1}(n)$ have reached values that reduce the effect of ISI caused by transmit FIR 230, the communication channel, and receive FIR 302.

In other embodiments, instead of the LMS algorithm, other adaptive algorithms can be used to adapt the tap weights of the adaptive chip rate LE 306 in order to reduce the effects of ISI. As an example of an adaptive algorithm other than the LMS algorithm, a "Recursive Least Squares" (RLS) algorithm could be used. Generally, in selecting an appropriate adaptive algorithm, factors such as rate of convergence of the algorithm (i.e. the number of iterations required by the algorithm), misadjustment factor (i.e. the amount by which the final value of the mean square error deviates from the optimum minimum mean square error), and computational complexity (i.e. the number of operations required to make one complete iteration of the algorithm) are considered. As an example, while the RLS algorithm converges more quickly than the LMS algorithm, the RLS algorithm has a higher computational complexity as compared with the LMS algorithm. As stated above, in the presently disclosed embodiments, any number of adaptive algorithms known in the art such as the LMS algorithm or the RLS algorithm can be used.

It is noted that the pilot chips required to perform the training of the coefficients of the adaptive chip rate LE 306 result in additional "overhead" since whenever the receiver knows what the transmitter is sending, the communication channel is not being used effectively. Thus, it is desirable to use as few training pilot chips as possible. However, if the combination of transmit FIR 230, the communication channel, and receive FIR 302 produces a large amount of ISI, it becomes necessary to continue to adapt the coefficients of adaptive chip rate LE 306 beyond the training mode. This continued adaptation is performed during the tracking mode of operation. In one embodiment, the tracking mode begins when the training mode has ended, but only if the time average of the mean square error obtained by comparing the desired output and the actual output of the adaptive chip rate LE 306 exceeds a certain threshold. In another embodiment, the tracking mode begins automatically and immediately following the training period.

In the tracking mode of operation, the coefficients (i.e. the tap weights) of adaptive chip rate LE 306 are adjusted during the transmission of each data frame from the transmitter. It is noted that the amount of ISI introduced during transmission of a message to the receiver is a function of time and can vary due to changes in various parameters such as multipath in the communication channel. As such, the amount of ISI generally varies from data frame to data frame, and also during each data frame. Thus, it is important to enter a tracking mode of operation to adapt the coefficients of the adaptive chip rate LE 306 after each training period.

A significant difference between the presently disclosed embodiments and other apparatus and methods utilized for adapting the coefficients of the receiver's adaptive linear equalizer 306 is the presence of Walsh covering in the received signal. The presence of Walsh covering in the received signal, i.e. in x(n) 307 in FIG. 3, prevents a simple comparison of the "desired output" and the "actual output" of the adaptive chip rate LE 306 during the tracking mode. As such, computing the required tracking mode error signal 315 for adjusting the coefficients of adaptive chip rate LE 306 is significantly different from methods presently used in the art.

In the tracking mode of operation of adaptive chip rate LE 306, system 300 in the receiver must generate tracking mode error signal 315 based on a comparison of the desired chip sequence with the actual chip sequence outputted by adaptive chip rate LE 306. The actual chip sequence outputted by adaptive chip rate LE 306 is simply output chip sequence ĉ(n) 309 which is a "soft estimate" of chip sequences representing the original message. In the present application, this "soft estimate," i.e. output chip sequence ĉ(n) 309, is also referred to as a "first plurality of chips."

In order to generate the tracking mode error signal, the "soft estimate" of chip sequences representing the original message needs be compared with a corresponding "hard estimate" of chip sequences representing the original message. Accordingly, in order to obtain the "hard estimate" of chip sequences representing the original message, first a "hard estimate" of the code symbols representing the original message must be obtained. From the hard estimate of the code symbols representing the original message, the required hard estimate of chip sequences representing the original message can be obtained by performing Walsh covering in a manner so as to duplicate the Walsh covering that was performed at the transmitter. Thus, a conversion of output chip sequence ĉ(n) 309 to a "soft estimate" of code symbols representing the original message, and a thresholding or slicing operation to obtain a "hard estimate" of the code symbols, and finally a conversion of the hard estimate of the code symbols to a "hard estimate" of Walsh chip sequences suitable for comparison to output chip sequence ĉ(n) 309 are performed.

As stated above, during the "decision directed" period, or the tracking mode, of operation of system 300 in the receiver, chip sequences outputted from PN despreader 308 are demultiplexed into 16 parallel outputs by DEMUX data epochs 312. N chip Walsh decover 314 then performs an operation on each of the 16 parallel chip sequences outputted by DEMUX data epochs 312 in order to remove the effects of N chip Walsh cover 218 and chip level summer 224 from the received chip sequences such that the 16 parallel outputs of N chip Walsh decover 314 are in the form of soft estimates of code symbols corresponding to the original message.

As seen in system 300 of FIG. 3, N chip Walsh decover 314 provides 16 parallel outputs containing soft estimates of the code symbols corresponding to the original message to parallel symbol slicers 318. Parallel symbol slicers 318 perform a thresholding or slicing operation on the 16 parallel soft estimates received from N chip Walsh decover 314. The 16 parallel outputs of parallel symbol slicers 318 are thus hard estimates of the code symbols corresponding to the original message. The 16 parallel outputs of parallel symbol slicers 318 are processed through N chip Walsh cover 320 and chip level summer 322 and PN spreader 324 in order to convert the hard estimates of code symbols at the output of parallel symbol slicers 318 into a hard estimate of chip sequences representing the original message. N chip Walsh cover 320, chip level summer 322, and PN spreader 324 perform the same functions as those performed, respectively, by N chip Walsh cover 218, chip level summer 224, and PN spreader 226 in system 200 in the transmitter. The output of PN spreader 324 is thus a hard estimate of chip sequences corresponding to the original message. In the present application, this "hard estimate" of chip sequences corresponding to the original message is also referred to as a "second plurality of chips."

However, through the operation of N chip Walsh cover 314, parallel symbol slicers 318, N chip Walsh cover 320, and chip level summer 322, a delay of N chip intervals (i.e. N*Tc) is introduced in the hard estimate of chip sequences at the output of PN spreader 324. For this reason, the hard estimate of chip sequences at the output of PN spreader 324 is chip sequence č[n−N] 325 as opposed to ĉ(n). It is noted that N is the order of the Walsh function matrix which in the present embodiment of the invention is 16. However, in other embodiments of the invention N equals 64 or 128 in which case the delay introduced in output chip sequence č[n−N] 325 is equal to, respectively, 64 or 128 chip intervals.

As seen in FIG. 3, the delayed desired output chip sequence č[n−N] 325 corresponding to the original message is provided to "tracking mode error signal generator" block 326. In order to apply an adaptive algorithm, such as the LMS algorithm, to generate an appropriate error signal and to adapt the tap weights of the adaptive chip rate LE 306, "tracking mode error signal generator" block 326 must compare the delayed desired output chip sequence č[n−N] 325 with a delayed version of the actual output chip sequence of adaptive chip rate LE 306. As stated above, since the exact amount of ISI caused by transmit FIR 230, the communication channel, and receive FIR 302 is a function of time, the desired output must be compared to the actual output corresponding to the same chip intervals. As such, actual output chip sequence ĉ(n) 309 of adaptive chip rate LE 306 is delayed by N chips to result in delayed actual output ĉ[n−N] 311 before being compared with the delayed desired output chip sequence č[n−N] 325.

The comparison of the delayed actual output and the delayed desired output is performed by "tracking mode error signal generator" block 326 to generate tracking mode error signal 315 which is fed to adaptive chip rate LE 306. Tracking mode error signal 315 is the same as tracking mode error signal 415 in FIG. 4. As depicted in FIG. 4, tracking mode error signal 415 is provided to various tap weights $u_0(n)$, $u_1(n)$ to $u_{m-1}(n)$, to adjust their respective values in order to adapt the response of the equalizer.

Tracking mode error signal 315 can be generated using various algorithms known in the art. For example, a "least mean square" ("LMS") algorithm could be used. As stated above, one goal of the LMS algorithm is to minimize the "mean square error" (MSE) resulting from a comparison of the delayed desired output chip sequence č[n−N] 325 with the delayed actual output chip sequence ĉ[n−N] 311 of adaptive chip rate LE 306. Upon a number of rapid iterations and adjustments to the tap weights of adaptive chip rate LE 306 based on the mean square error, the LMS algorithm "converges," i.e. the mean square error approaches a constant value.

As discussed above, according to the LMS algorithm, the values of tap weights of adaptive chip rate LE 306, shown in detail as adaptive chip rate LE 406 in FIG. 4, are calculated as follows:

$$u_k(n+1) = u_k(n) + \Delta x_k(n) e^*(n) \quad \text{equation (2)}$$

where $x_k(n) = x(n-k)$, k being an integer between 0 and m−1;

where $e(n) = č[n-N] - ĉ[n-N]$; and $$ĉ(n) = \sum_{k=0}^{m-1} u_k^*(n) x_k(n)$$

and where $\Delta$ is a constant.

where $u_k(n)$ are tap weights in adaptive chip rate LE 406 in FIG. 4 at chip interval n, where č[n−N] is č[n−N] 325 and ĉ[n−N] is ĉ[n−N] 311 in system 300 of FIG. 3. As stated above, the constant $\Delta$ is chosen so as to control the variation between tap weights on successive iterations. It may be desirable to use changing values of $\Delta$ to achieve a faster conversion and a lower mean square error. It is noted that during the tracking mode of operation, e(n) is the tracking mode error signal at chip interval n and that e(n) is the same as tracking mode error signal 315 in FIG. 3 (or tracking mode error signal 415 in FIG. 4).

Thus, each present tap weight $u_0(n)$, $u_1(n)$ to $u_{m-1}(n)$ is adjusted to a corresponding new tap weight $u_0(n+1)$, $u_1(n+1)$ to $u_{m-1}(n+1)$ by adding the respective present tap weight to the product of the constant $\Delta$, the corresponding input value $x_0(n)$, $x_1(n)$ to $x_{m-1}(n)$, and the present value of error signal e(n). The iterative process in equation (2) is repeated once every chip interval Tc in a programming loop while adaptive equalizer 306 attempts to converge and minimize the error signal e(n). Upon reaching convergence, the adaptive algorithm freezes the tap weights until the error signal e(n) exceeds an acceptable level or until a new training pilot chip sequence is sent from the transmitter. As in the training mode of operation, instead of the LMS algorithm, other adaptive algorithms can be used to adapt the tap weights of adaptive chip rate LE 306 in order to reduce the effects of ISI during the tracking mode of operation. As an example of an adaptive algorithm other than the LMS algorithm, an RLS algorithm could be used in the tracking mode of operation.

As seen in the exemplary system 300 in FIG. 3, the 16 parallel outputs of N chip Walsh decover 314 are provided to MUX 316, which is a 16-to-one multiplexer. MUX 316 multiplexes one of the 16 code symbols provided in parallel by N chip Walsh decover 314 to channel deinterleaver 328 whose output is in turn provided to demodulator 330. The output of demodulator 330 is processed by modulation deinterleaver 332. Finally, decoder 334 receives its input from modulation deinterleaver 332 and provides decoded data bits 342 at its output. The structure and function of channel deinterleaver 328, demodulator 330, modulation deinterleaver 332, and decoder 334 are well known in the art. The combined effect of these modules, i.e. channel deinterleaver 328, demodulator 330, modulation deinterleaver 332, and decoder 334 in system 300, is to reverse the combined effect of encoder 204, modulation interleaver 206, modulator 208, and channel interleaver 210 in system 200. The final output of system 300, i.e. decoded data bits 342, should ideally be the same as data bits 202 at the input of system 200 in FIG. 2.

From the above description, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, instead of adapting the coefficients of adaptive chip rate LE 306 at every chip interval, the coefficients can be adapted once every N chip intervals. In the exemplary system 300, this means that the tracking error signal e(n) in equation (2) is the sum of differences between $e(n) = č[n-N] - ĉ[n-N]$ for 16 chips instead of a single chip. Thus, e(n) is generated at every 16 chip interval, corresponding to the sum of 16 chip-level differences. Manifestly, the magnitude of error signal e(n) would be larger since it represents the sum of 16 chip level "errors." However, since the constant $\Delta$ is a small value, equation (2) may still be properly applied to obtain new tap weights once every 16 chip intervals for adaptive chip rate LE 306.

Moreover, it is understood that the described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a method and apparatus for adaptive linear equalization for Walsh covered modulation have been described.

What is claimed is:

1. A method for a spread spectrum communication system, comprising:
generating a soft estimate of a sequence of chips, for decoding a received channel in said spread spectrum communication system;
Walsh decovering said soft estimate of said sequence of chips to produce a soft estimate of a plurality of symbols;
applying a slicing operation to said soft estimate of said plurality of symbols to generate a hard estimate of said plurality of symbols;
Walsh covering said hard estimate of said plurality of symbols to produce a hard estimate of said sequence of chips;
comparing said soft estimate of said sequence of chips with said hard estimate of said sequence of chips to generate an error signal;
applying said error signal to adapt a response of an equalizer used for said generating said soft estimates of said sequence of chips.

2. The method of claim 1 further comprising:
transmitting a signal carrying said sequence of chips of said channel to said equalizer for said generating said soft estimates of said sequence of chips.

3. The method of claim 1 further comprising:
adapting a tap weight of a multiplier of said equalizer for said applying said error signal.

4. An apparatus for a spread spectrum communication system, comprising:
means for generating a soft estimate of a sequence of chips, for decoding a received channel in said spread spectrum communication system;
means for Walsh decovering said soft estimate of said sequence of chips to produce a soft estimate of a plurality of symbols;
means for applying a slicing operation to said soft estimate of said plurality of symbols to generate a hard estimate of said plurality of symbols;
means for Walsh covering said hard estimate of said plurality of symbols to produce a hard estimate of said sequence of chips;
means for comparing said soft estimate of said sequence of chips with said hard estimate of said sequence of chips to generate an error signal;
means for applying said error signal to adapt a response of an equalizer used for said generating said soft estimates of said sequence of chips.

5. The apparatus of claim 4 further comprising:
means for transmitting a signal carrying said sequence of chips of said channel to said equalizer for said generating said soft estimates of said sequence of chips.

6. The apparatus of claim 3 further comprising:
means for adapting a tap weight of a multiplier of said equalizer for said applying said error signal.

7. A method for a spread spectrum communication system, comprising:
transmitting a signal carrying a sequence of chips of a communication channel;
receiving said signal at a receiver in said spread spectrum communication system;
processing said signal for generating a soft estimates of said sequence of chips for an equalizer;
Walsh decovering said soft estimate of said sequence of chips to produce a soft estimate of a plurality of symbols;
applying a slicing operation to said soft estimate of said plurality of symbols to generate a hard estimate of said plurality of symbols;
Walsh covering said hard estimate of said plurality of symbols to produce a hard estimate of said sequence of chips;
comparing said soft estimate of said sequence of chips with said hard estimate of said sequence of chips to generate an error signal;
applying said error signal to adapt a response of said equalizer for said generating said soft estimates of said sequence of chips while adapting a tap weight of a multiplier of said equalizer by said applying said error signal.

8. An apparatus for a spread spectrum communication system, comprising:
means for transmitting a signal carrying a sequence of chips of a communication channel;
means for receiving said signal at a receiver in said spread spectrum communication system;
means for processing said signal for generating a soft estimates of said sequence of chips for an equalizer;
means for Walsh decovering said soft estimate of said sequence of chips to produce a soft estimate of a plurality of symbols;
means for applying a slicing operation to said soft estimate of said plurality of symbols to generate a hard estimate of said plurality of symbols;
means for Walsh covering said hard estimate of said plurality of symbols to produce a hard estimate of said sequence of chips;
means for comparing said soft estimate of said sequence of chips with said hard estimate of said sequence of chips to generate an error signal;
means for applying said error signal to adapt a response of said equalizer for said generating said soft estimates of said sequence of chips while adapting a tap weight of a multiplier of said equalizer by said applying said error signal.

9. A method for operation of an equalizer, comprising:
generating a soft estimate of a sequence of chips;
Walsh decovering said soft estimate of said sequence of chips to produce a soft estimate of a plurality of symbols;
applying a slicing operation to said soft estimate of said plurality of symbols to generate a hard estimate of said plurality of symbols;
Walsh covering said hard estimate of said plurality of symbols to produce a hard estimate of said sequence of chips.

10. The method as recited in claim 9 further comprising:
comparing said soft estimate of said sequence of chips with said hard estimate of said sequence of chips to generate an error signal;
applying said error signal to adapt a response of said equalizer used for said generating said soft estimates of said sequence of chips.

11. The method of claim 10 further comprising:
adapting a tap weight of a multiplier of said equalizer for said applying said error signal.

12. An apparatus for operation of an equalizer, comprising:
- means for generating a soft estimate of a sequence of chips;
- means for Walsh decovering said soft estimate of said sequence of chips to produce a soft estimate of a plurality of symbols;
- means for applying a slicing operation to said soft estimate of said plurality of symbols to generate a hard estimate of said plurality of symbols;
- Walsh covering said hard estimate of said plurality of symbols to produce a hard estimate of said sequence of chips.

13. The apparatus as recited in claim 12 further comprising:
- means for comparing said soft estimate of said sequence of chips with said hard estimate of said sequence of chips to generate an error signal;
- means for applying said error signal to adapt a response of said equalizer used for said generating said soft estimates of said sequence of chips.

14. The apparatus of claim 12 further comprising:
- means for adapting a tap weight of a multiplier of said equalizer for said applying said error signal.

* * * * *